United States Patent [19]

Keeney et al.

[11] Patent Number: 5,335,040
[45] Date of Patent: Aug. 2, 1994

[54] APPARATUS FOR SELECTIVELY NOTCHING OR CUTTING PHOTOGRAPHIC FILM OR THE LIKE

[75] Inventors: Richard A. Keeney, Eagan; Gerald Jensen, Plymouth, both of Minn.

[73] Assignee: Management Graphics, Inc., Minneapolis, Minn.

[21] Appl. No.: 957,220

[22] Filed: Oct. 6, 1992

[51] Int. Cl.$^5$ ............................................. G03B 19/00
[52] U.S. Cl. .................................................. 354/354
[58] Field of Search ................ 355/28, 29, 40, 41; 354/319, 320, 354, 211, 105, 106; 83/477.2, 508, 349, 620, 529, 530, 587, 607, 525, 587, 683

[56] References Cited

U.S. PATENT DOCUMENTS

| | | | |
|---|---|---|---|
| 2,177,788 | 10/1939 | Ross | 354/105 |
| 2,470,291 | 5/1949 | Collins | 354/105 |
| 2,497,358 | 2/1950 | Huntzinger | 354/105 |
| 3,850,068 | 11/1974 | Bradam | 83/529 |
| 4,079,646 | 3/1978 | Morishita | 83/349 |
| 4,641,019 | 2/1987 | Inatsuki | 355/29 |
| 4,651,609 | 3/1987 | Dobring et al. | 83/620 |
| 4,862,200 | 8/1989 | Hicks | 354/75 |

*Primary Examiner*—D. Rutledge
*Attorney, Agent, or Firm*—Barry R. Lipsitz

[57] ABSTRACT

Apparatus is disclosed for selectively notching an edge of a material such as photographic film or cutting through the material using the same blade. The material is guided by a path, and the blade is mounted for variable penetration into the path. One or more solenoids are responsive to a first control command for driving the blade a first distance into the path to notch an edge of the material therein, and responsive to a second control command for driving the blade a second distance into the path to cut entirely through the material. The apparatus has particular application as a cutter/notcher for a film recorder.

19 Claims, 2 Drawing Sheets

APPARATUS FOR SELECTIVELY NOTCHING OR CUTTING PHOTOGRAPHIC FILM OR THE LIKE

BACKGROUND OF THE INVENTION

The present invention relates to apparatus for handling strip material, such as photographic apparatus, and more particularly to apparatus for selectively notching an edge or cutting the whole way through a strip of material such as photographic film.

One type of photographic apparatus that uses strip material (i.e., photosensitive film) is a film recorder. In a conventional film recorder, a light beam from a cathode ray tube ("CRT") or the like is controlled by a deflection system to scan across a stationary frame of photographic film to expose the film with an image. Typically, the images are generated by a computer for the production of slides, transparencies, photographs, or the like. Alternatively, the images can comprise natural images acquired by a scanner or television camera for subsequent processing by a computer.

Known film recorders, such as those sold under the trademark "SOLITAIRE" by Management Graphics, Inc. of Minneapolis, Minn., U.S.A., typically include a light source such as a CRT for producing a beam, a deflection system for scanning the beam across the face of the CRT, a system control and central processor unit ("CPU") for controlling the deflection system, and a camera (i.e., "film transport"). The latter component may include a film transport body, lens, lens mounting assembly, aperture plate, film plate, and film transport mechanism. On a Solitaire film recorder, an image to be recorded is first written on the phosphor of the CRT by deflecting an electron beam in a raster pattern and modulating the intensity of the beam. This process is analogous to the creation of a television picture. Alternatively, the image can be written on the CRT using well known time modulation techniques, wherein the beam intensity is constant but the time the beam is kept at each point is varied depending on the exposure required.

The resulting pattern (the "object image") on the CRT is optically imaged onto photographic film by the film transport, which contains the required optics and mechanism to advance the film to successive frames. Other types of light sources can be substituted for the CRT in a film recorder. Examples include fiber optic sources, lasers, and focused light impinging a rotating drum wherein one or more rotations are completed for each scan line.

Film recorders typically accommodate film cassettes which hold long spools of film. It is often desired to remove just a portion of the film after exposure thereof for photographic development. Additional exposures can be made on the film which remains in the film cassette. In order to remove just a portion of film that has been exposed, a cutting mechanism is provided in the film recorder. It is known to provide such a cutting mechanism that comprises a blade operated by an electrically actuated solenoid.

It may also be desirable to merely mark the edge of a film by slitting or notching to enable a photographer or film processing technician ("operator") to identify the beginning of different "takes" in the darkroom. The operator has to merely run his fingers along the edge of the film until he feels a slit or notch that identifies the beginning of each take. Hereinafter, the terms "slitting" and "notching" (or "slit" and "notch") are used interchangeably, and the use of one is not meant to preclude the use of the other or to otherwise limit the scope of the present invention.

The provision of slits in the edge of the film is also useful where the darkroom equipment is limited in the number of frames that it can process at one time. For example, in the "dip and dunk" developing technique, the developing equipment can typically accommodate a maximum length of 36 frames. By providing a slit in the edge of the film every 36 frames, the darkroom operator can easily tear through the film at the slit to obtain strips having a length of 36 frames.

The separate concepts of notching and cutting are known in the art. U.S. Pat. Nos. 2,177,788; 2,470,291; 2,497,358; and 4,862,200 all disclose film notching arrangements. This group of patents discloses both manual and automated notching techniques. For example, in the '291 patent, a solenoid is disclosed that actuates a cylindrical punch rod to punch the film. However, no combined mechanisms are disclosed that can both notch and cut the film.

It would be advantageous to provide apparatus that can selectively slit just the edge of a strip of material, or cut all the way through the material. The slitting option would be used when it is desired to mark successive takes in the film or to facilitate tearing through the film in the darkroom. When it is desired to provide a length of film for developing that is less than the entire length stored in a photographic apparatus, the apparatus would be actuated to cut all the way through the film.

The present invention provides an apparatus enjoying the aforementioned advantages.

SUMMARY OF THE INVENTION

In accordance with the present invention, apparatus is provided for selectively slitting a portion of a material or severing the material by cutting entirely through it. Means are provided for guiding the material along a path. A blade is mounted for variable penetration into the path. Automated drive means operatively associated with the blade drive the blade into the path. The drive means are selectively actuable to move the blade to a first position to notch (i.e., slit) a portion of the material and to a second position to sever the material.

The drive means can comprise, for example, a first solenoid coupled to the blade for moving the blade from a rest position outside of the path that guides the material to a second position. The blade passes through the first position as it travels to the second position. Means are provided for introducing a stop into the path of the blade as it travels from the rest position. The stop limits the travel of the blade to the first position. The means for introducing the stop can comprise a second solenoid.

Electrical control means are used to actuate the first solenoid and selectively actuate the second solenoid to effect a notching or cutting of the material. In an illustrated embodiment, the blade is pivotally coupled at a first end thereof to a plunger shaft of the first solenoid and pivotally connected at a second end thereof to a fixed member. Spring means are provided for biasing the blade into the rest position. For example, the spring means can apply a spring force to the second end of the blade. In the illustrated embodiment, the blade, when in the first position, slits an edge of the material.

DETAILED DESCRIPTION OF THE INVENTION

Figure 1:
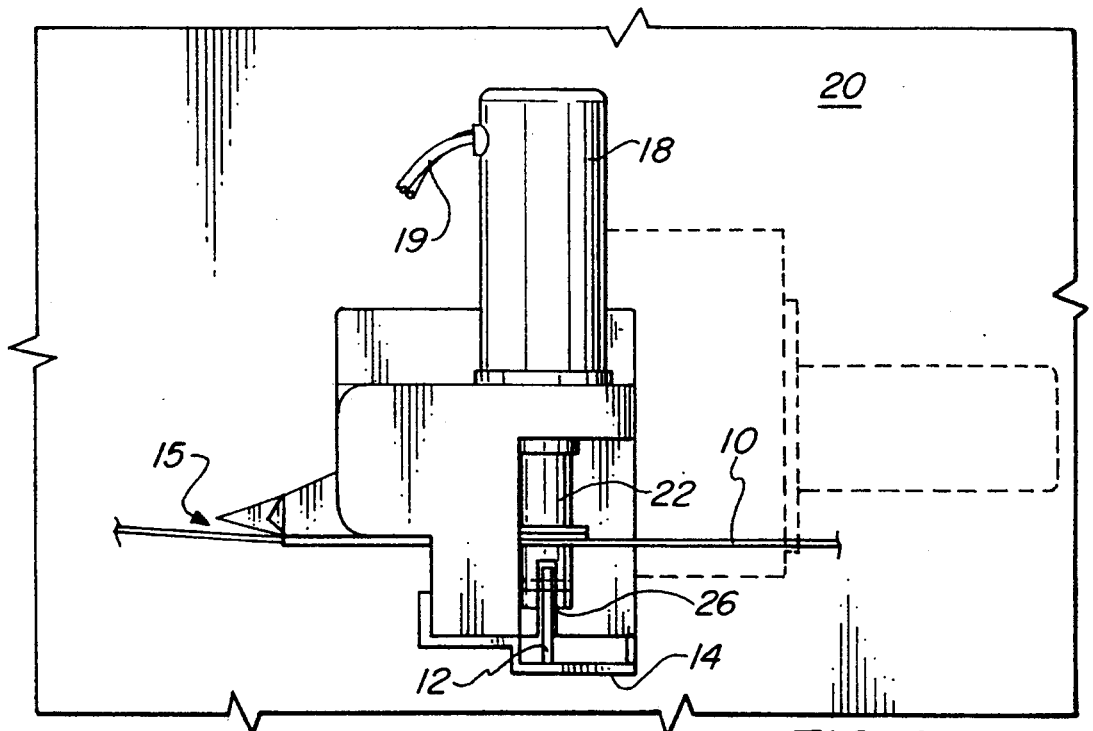
FIG. 1 is a top plan view of apparatus in accordance with the present invention.
Figure 2:
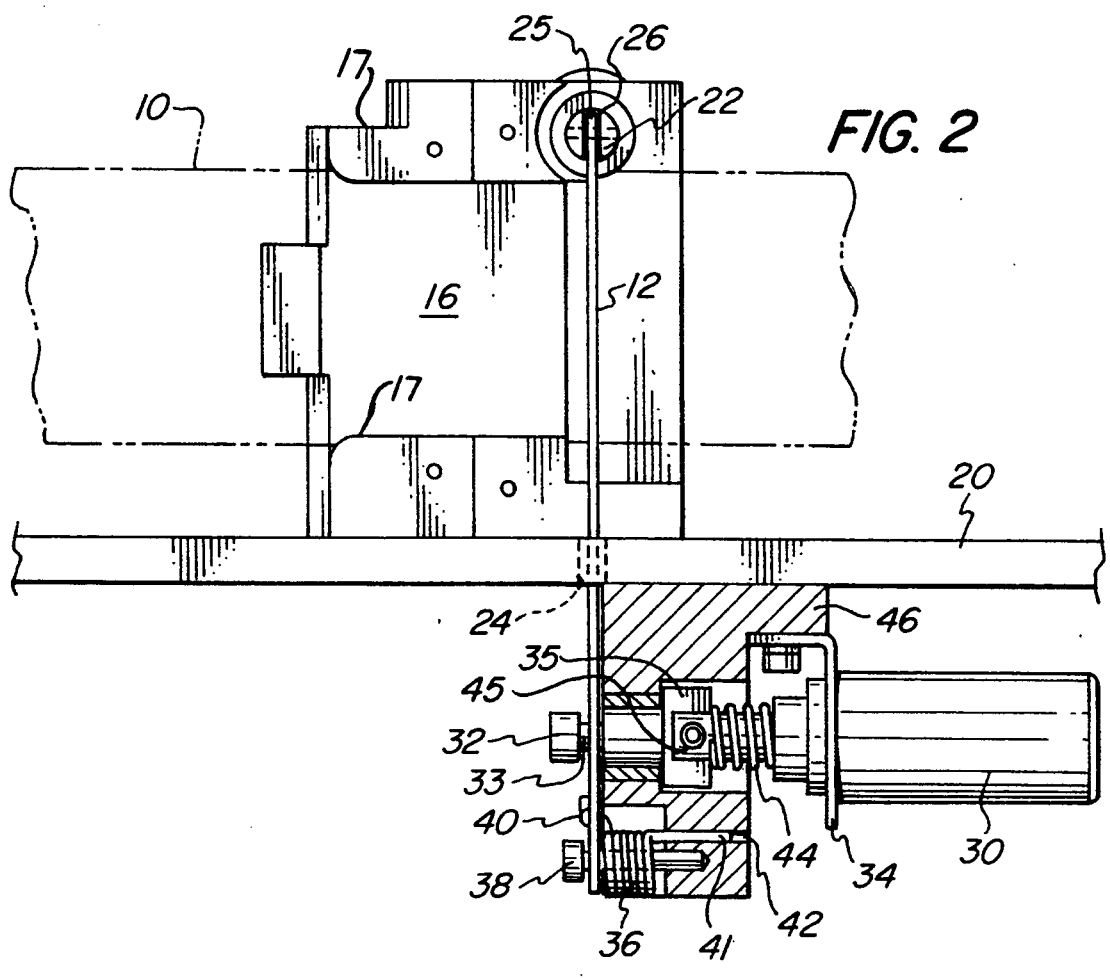
FIG. 2 is a front plan view in partial cross section of the apparatus of FIG. 1.
Figure 3:
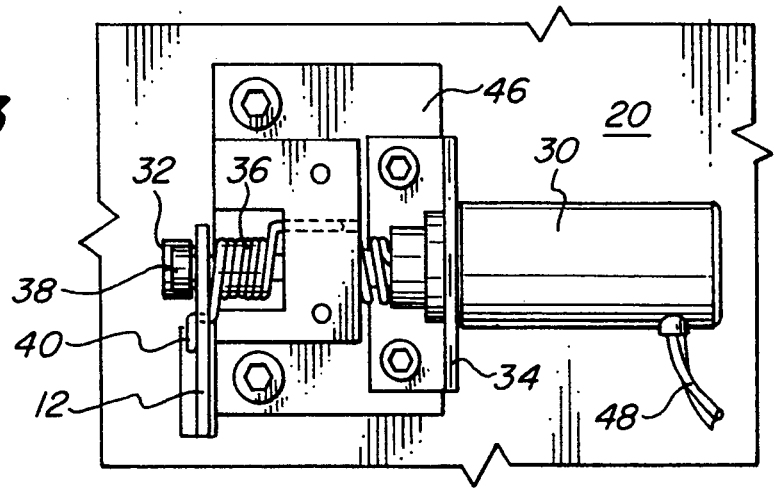
FIG. 3 is a bottom plan view of the apparatus of FIGS. 1 and 2 illustrating the blade stop mechanism.

The present invention provides apparatus for selectively notching the edge of a strip material such as photographic film or severing the material by cutting entirely through it. An embodiment of such apparatus using separate blade and stop solenoids is illustrated in the figures. It should be appreciated that the invention can be implemented in various different embodiments, for example, using a single solenoid that is rapidly pulsed to perform a slitting operation or actuated for a longer time, sufficient to fully retract the solenoid plunger, and thereby effect a cutting operation.

In the illustrated embodiment, a separate cutting solenoid 18 and stop solenoid 30 are used. The plunger 22 of cutting solenoid 18 is pivotally mounted via a pin 50 that extends across a slot 26 provided in solenoid plunger 22. A first end 25 of blade 12 partially rides within slot 26 of plunger 22. A strip 10 to be notched or cut rides in a path 15 defined by a guide 7 of the apparatus. In a photographic apparatus such as a film recorder, the film plane 16 is located adjacent the cutting edge 54 of blade 12. A cover 14 provides a stop for end 25 of blade 12 in its fully extended position as illustrated in FIG. 4.

Solenoid 18 and its associated components are mounted on top of a deck or base plate 20 that includes a slit 24 through which blade 12 passes. A second end 52 of blade 12 is pivotally attached via screw 38 to a mounting block 46 that is mounted to the underside of base plate 20. A spring 36 having a first end 41 fixedly mounted in a hole 42 of mounting block 46 and a second end 40 projecting through a hole 44 of blade 12 biases the blade into its fully extended "rest" position illustrated in the figures.

Figure 4:
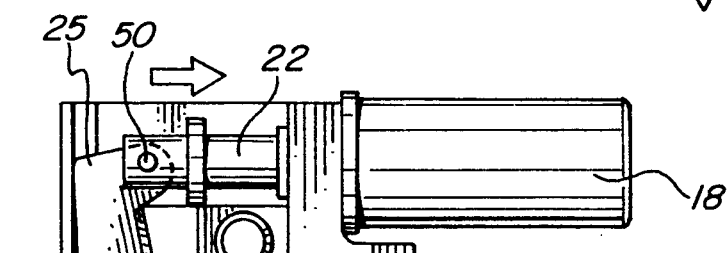
FIG. 4 is a side view of the apparatus partially broken away to show the mounting of the cutter solenoid assembly on base 20.
Figure 4:
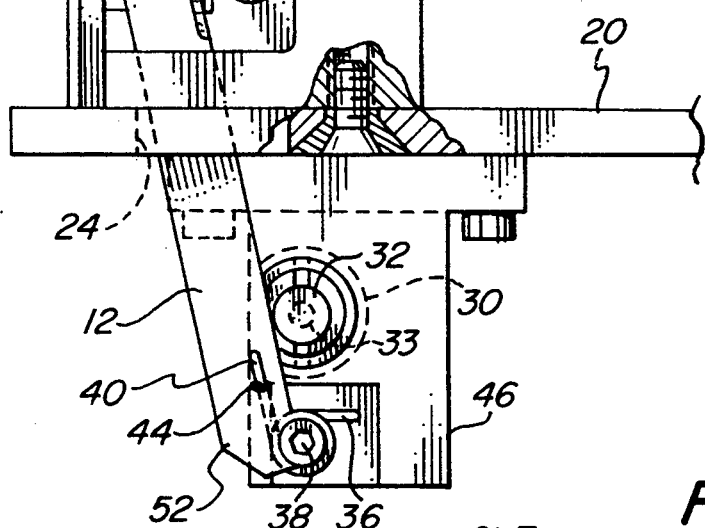

In operation, when cutter solenoid 18 is actuated, blade 12 is drawn in the direction illustrated by the arrow in FIG. 4, and will cut all the way through the material 10 unless blocked from fully penetrating the material. A stop solenoid 30 is mounted via bracket 34 and mounting block 46 to the underside of base plate 20 in order to block the full travel of blade 12 when it is desired to only slit an edge of the material 10. For this purpose, a blocking pin 35 is mounted to plunger 45 of stop solenoid 30. A spring 44 normally biases the solenoid plunger into a fully extended position. When it is desired to merely notch the edge of material 10 instead of cutting all the way through it, stop solenoid 30 is actuated, which draws plunger 45 into the solenoid and positions stop 32 in the path of blade 12. This prevents blade 12 from being fully retracted by blade solenoid 18, thereby causing cutting surface 54 to only notch the edge of the material instead of cutting all the way through it.

Figure 5:
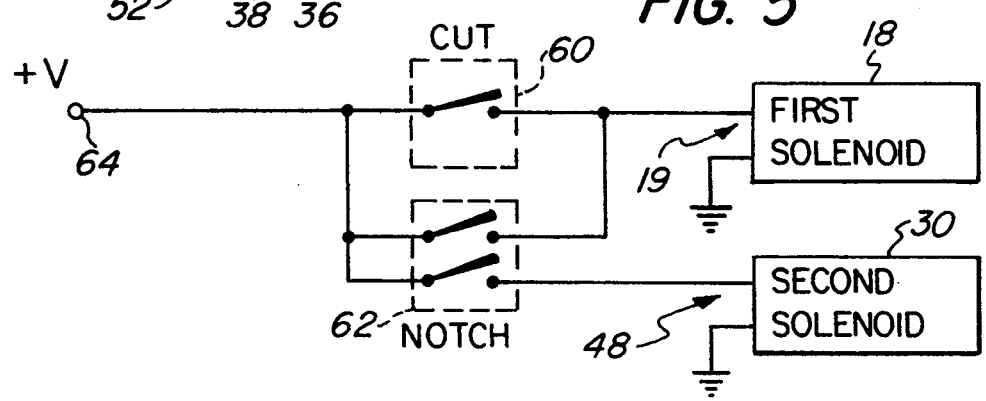
FIG. 5 is a block diagram of a switching arrangement for use in selectively actuating the first and second solenoids to perform a cutting or notching operation.

FIG. 5 illustrates a control switching arrangement for providing either a notch in the edge of material 10 or a full cut therethrough. Power for first solenoid 18 and second solenoid 30 is provided from terminal 64 via switches 60, 62. First solenoid 18 is energized via wires 19 by either switch 60 or switch 62. Second solenoid 30 is actuated via wires 48 only by switch 62. Therefore, when it is desired to cut all the way through material 10, switch 60 is used to actuate first solenoid 18 only. Cutter blade 12 will be fully retracted by blade solenoid 18 since the second end of the blade will be able to move behind stop 32 into the groove 33 provided in the blocking pin 35. When it is desired to merely notch the edge of material 10, switch 62 is used. This actuates both first solenoid 18 and second solenoid 30. As noted above, when second solenoid 30 is actuated, plunger 45 is withdrawn into the solenoid and stop 32 will be positioned in the path of blade 12 to block it from fully penetrating the material 10. Thus, only an edge of the material will be slit.

It should now be appreciated that the present invention provides apparatus for selectively notching a portion of a material or severing the material by cutting entirely through it. A blade is mounted for variable penetration into a path that guides the material. Automated drive means, which may comprise one or more solenoids, are selectively actuable to move the blade to a first position to notch an edge of the material and to a second position to sever the material.

Although the invention has been described in connection with a preferred embodiment thereof, those skilled in the art will appreciate that numerous adaptations and modifications may be made thereto without departing from the spirit and scope of the invention as set forth in the claims.

We claim:

1. Apparatus for selectively notching a portion of a material or severing said material by cutting entirely through it comprising:
   means for guiding a material along a path;
   a blade mounted for variable penetration into said path; and
   automated drive means interconnected with said blade for driving said blade into said path;
   wherein said drive means:
   are selectively actuable to move said blade to a first position to notch a portion of said material and to a second position to sever said material; and
   include a first solenoid drivingly engageable with said blade for moving said blade from a rest position outside of said path to said second position, said blade passing through said first position as it travels to said second position.

2. Apparatus in accordance with claim 1 wherein said drive means further comprise:
   means for introducing a stop into the path of said blade as it travels from said rest position, said stop limiting the travel of said blade to said first position.

3. Apparatus in accordance with claim 2 wherein said stop introducing means comprise a second solenoid.

4. Apparatus in accordance with claim 3 further comprising electrical control means for actuating said first solenoid and selectively actuating said second solenoid to effect a notching or cutting of said material.

5. Apparatus in accordance with claim 4 wherein said blade is pivotally coupled at a first end thereof to a plunger shaft of said first solenoid and pivotally connected at a second end thereof to a fixed member; said apparatus further comprising:
   spring means for biasing said blade into said rest position.

6. Apparatus in accordance with claim 5 wherein said spring means apply a spring force to the second end of said blade.

7. Apparatus in accordance with claim 2 wherein said blade is pivotally coupled at a first end thereof to a plunger shaft of said first solenoid and pivotally connected at a second end thereof to a fixed member; said apparatus further comprising:
   spring means for biasing said blade into said rest position.

8. Apparatus in accordance with claim 7 wherein said spring means apply a spring force to the second end of said blade.

9. Apparatus in accordance with claim 1 wherein said blade in said first position notches an edge of said material.

10. Apparatus for selectively notching an edge of a photographic film or cutting through said film using the same blade comprising:
    a film path;
    a blade mounted for variable penetration into said path; and
    drive means responsive to a first electrical control command for driving said blade a first distance into said path to notch an edge of film in said film path and responsive to a second electrical control command for driving said blade a second distance into said path to cut through film in the film path.

11. Apparatus in accordance with claim 10 wherein said drive means comprise:
    a first solenoid coupled to said blade for moving said blade from a rest position outside of said film path into said film path at least as far as said second distance, and
    means for introducing a stop into the path of said blade as it travels from said rest position, said stop limiting the travel of said blade to effect a notch instead of a full cut through said film.

12. Apparatus in accordance with claim 11 wherein said stop introducing means comprise a second solenoid.

13. Apparatus in accordance with claim 12 wherein said first solenoid is responsive to said first and second electrical control commands to move said blade into said film path and said second solenoid is responsive to said second control command to place said stop into the path of said blade.

14. Apparatus in accordance with claim 13 wherein said blade is pivotally coupled at a first end thereof to a plunger shaft of said first solenoid and pivotally connected at a second end thereof to a fixed member; said apparatus further comprising:
    spring means for biasing said blade into said rest position.

15. Apparatus in accordance with claim 14 wherein said spring means apply a spring force to the second end of said blade.

16. Apparatus in accordance with claim 11 wherein said blade is pivotally coupled at a first end thereof to a plunger shaft of said first solenoid and pivotally connected at a second end thereof to a fixed member; said apparatus further comprising:
    spring means for biasing said blade into said rest position.

17. Apparatus in accordance with claim 16 wherein said spring means apply a spring force to the second end of said blade.

18. Apparatus for selectively notching a portion of a material or severing said material by cutting entirely through it comprising:
    means for guiding a material along a path;
    a blade mounted for variable penetration into said path; and
    automated drive means interconnected with said blade for driving said blade into said path;
    wherein said drive means;
        are selectively actuable to move said blade to a first position to notch a portion of said material and to a second position to sever said material; and
        include a solenoid for introducing a stop into the path of said blade for stopping said blade in said first position.

19. Apparatus for selectively notching a portion of a material or severing said material by cutting entirely through it comprising:
    means for guiding a material along a path;
    a blade mounted for variable penetration into said path; and
    automated drive means including a solenoid interconnected with said blade for driving said blade into said path; wherein:
        said drive means are selectively actuable to move said blade to a first position to notch a portion of said material and to a second position to sever said material;
        said blade is pivotally coupled at a first end thereof to a plunger shaft of said solenoid and pivotally connected at a second end thereof to a fixed member;
    said apparatus further comprising spring means for biasing said blade into a rest position outside of said path.

* * * * *